(12) United States Patent
Heuss et al.

(10) Patent No.: US 12,539,916 B2
(45) Date of Patent: Feb. 3, 2026

(54) METHOD FOR MANEUVERING A VEHICLE

(71) Applicant: Robert Bosch GmbH, Stuttgart (DE)

(72) Inventors: Kerstin Heuss, Bietigheim-Bissingen (DE); Stefan Kanngiesser, Schwaebisch Gmuend (DE); Daniel Hermes, Recke (DE); Matthias Schlegel, Sachsenheim (DE); Stefan Aust, Schwaebisch Gmuend (DE); Thomas Specker, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 17/656,582

(22) Filed: Mar. 25, 2022

(65) Prior Publication Data

US 2022/0324512 A1 Oct. 13, 2022

(30) Foreign Application Priority Data

Apr. 7, 2021 (DE) ...................... 10 2021 203 404.7

(51) Int. Cl.
*B62D 15/02* (2006.01)
*B60W 50/12* (2012.01)
*B60W 60/00* (2020.01)

(52) U.S. Cl.
CPC ......... *B62D 15/0265* (2013.01); *B60W 50/12* (2013.01); *B60W 60/0051* (2020.02); *B62D 15/027* (2013.01); *B60W 2540/18* (2013.01)

(58) Field of Classification Search
CPC .............. B62D 15/0265; B62D 15/027; B62D 15/0285; B62D 6/007; B60W 50/12;
(Continued)

(56) References Cited

U.S. PATENT DOCUMENTS

2003/0024760 A1* 2/2003 Ozsoylu ............... B62D 5/0442
180/444
2004/0267423 A1* 12/2004 Iwazaki ............ B62D 15/0285
701/41
(Continued)

FOREIGN PATENT DOCUMENTS

DE 10 2008 012 685 A1 10/2009
DE 10 2014 225 594 A1 6/2016
(Continued)

OTHER PUBLICATIONS

S. A. Mortazavizadeh, A. Ghaderi, M. Ebrahimi and M. Hajian, "Recent Developments in the Vehicle Steer-by-Wire System," in IEEE Transactions on Transportation Electrification, vol. 6, No. 3, pp. 1226-1235, Sep. 2020 (Year: 2020).*
(Continued)

*Primary Examiner* — Aniss Chad
*Assistant Examiner* — Stephanie T Su
(74) *Attorney, Agent, or Firm* — Maginot, Moore & Beck LLP

(57) ABSTRACT

A method is proposed for maneuvering a vehicle. The vehicle has a steer-by-wire steering system having a steering handle and a steering gear actuator for changing a travel direction of the vehicle. In a manual driving operating state, a maneuvering process is detected based on a steering specification at the steering handle and a vehicle velocity. A target vehicle trajectory correlated with a driver intention for the maneuvering process is ascertained or predicted based on the steering specification at the steering handle and an environmental condition. An actual vehicle trajectory is progressively compared during the maneuvering process to the target vehicle trajectory. The actual vehicle trajectory is corrected in the event of a deviation from the target vehicle trajectory by means of a maneuvering assistance function (Continued)

and by an assisting intervention of the maneuvering assistance function in a lateral control of the vehicle.

10 Claims, 4 Drawing Sheets

(58) Field of Classification Search
CPC ......... B60W 60/0051; B60W 2540/18; B60W 30/08; B60W 30/095; B60W 30/181; B60W 2520/04; B60W 2520/06; B60W 2520/10; B60W 2552/50; B60W 2555/20
See application file for complete search history.

(56) References Cited

U.S. PATENT DOCUMENTS

| | | | | |
|---|---|---|---|---|
| 2009/0164066 | A1* | 6/2009 | Oezaslan | B62D 15/0285 701/41 |
| 2012/0123642 | A1* | 5/2012 | Kojo | B62D 15/025 701/41 |
| 2015/0251664 | A1* | 9/2015 | Zagorski | B60W 30/02 701/1 |
| 2018/0354503 | A1* | 12/2018 | Sassa | B62D 15/0285 |
| 2019/0118801 | A1* | 4/2019 | Noh | B62D 15/0285 |
| 2020/0189336 | A1* | 6/2020 | Sharma | B60T 7/22 |
| 2020/0406924 | A1* | 12/2020 | Chew | B62D 1/22 |
| 2021/0255614 | A1* | 8/2021 | Yamazaki | G05D 1/0011 |
| 2022/0048558 | A1* | 2/2022 | Christian, Jr. | B62D 15/0245 |
| 2022/0227420 | A1* | 7/2022 | Shimanaka | B60W 30/09 |
| 2022/0297676 | A1* | 9/2022 | Suzuki | B60W 60/005 |

FOREIGN PATENT DOCUMENTS

| | | |
|---|---|---|
| DE | 10 2017 204 830 A1 | 9/2018 |
| DE | 10 2019 204 565 A1 | 10/2020 |

OTHER PUBLICATIONS

Reimann, G., Brenner, P., Buring, H. (2015). Steering Actuator Systems. In: Winner, H., Hakuli, S., Lotz, F., Singer, C. (eds) Handbook of Driver Assistance Systems. Springer, Cham. (Year: 2015).*

S. A. Mortazavizadeh, A. Ghaderi, M. Ebrahimi and M. Hajian, "Recent Developments in the Vehicle Steer-by-Wire System," in IEEE Transactions on Transportation Electrification, vol. 6, No. 3, pp. 1226-1235, Sep. 2020 (Year: 2020) (Year: 2020).*

U.S. Department of Justice, Archives, Criminal Resource Manual 1303. Definitions—"Motor Vehicle"—"Aircraft"—"Security." (Year: 2020).*

* cited by examiner

METHOD FOR MANEUVERING A VEHICLE

This application claims priority under 35 U.S.C. § 119 to application no. DE 10 2021 203 404.7, filed on Apr. 7, 2021 in Germany, the disclosure of which is incorporated herein by reference in its entirety.

TECHNICAL FIELD

The disclosure relates to a method for maneuvering a vehicle. Moreover, the disclosure relates to a processing unit for carrying out such a method and a vehicle having such a processing unit.

BACKGROUND

Vehicles having steer-by-wire steering systems are known from the prior art, which manage without a direct mechanical connection between a steering handle and steered vehicle wheels and in which a steering specification at the steering handle is exclusively passed on electrically. To change a travel direction of the vehicle, the steer-by-wire steering systems comprise a steering gear actuator electrically connected to the steering handle. Such a vehicle having a steer-by-wire steering system and an associated method for maneuvering the vehicle is known, for example, from DE 10 2017 204 830 A1 and/or DE 10 2019 204 565 A1.

DE 10 2017 204 830 A1 discloses a maneuvering process in the form of an autonomous or semiautonomous parking process. In the latter case, a vehicle trajectory for the autonomous driving process can be corrected by the driver. In both cases, however, the vehicle is in an automated and/or autonomous driving operating state during the maneuvering process and is accordingly not manually controlled by the driver.

Furthermore, DE 10 2019 204 565 A1 discloses a method for avoiding damage to a vehicle wheel during a maneuvering process. For this purpose, an object and/or obstacle in the region of the vehicle wheel is ascertained and taken into consideration during an activation of the vehicle wheel. A change of the wheel steering angle of the vehicle wheel is therefore only carried out by the software function if an object and/or obstacle is detected in the region of the vehicle wheel and therefore independently of a target vehicle trajectory for the maneuvering process correlated with a driver intention. In addition, the intervention takes place in such a way that the vehicle trajectory specified by the driver remains unchanged.

An automatic and corrective intervention in a lateral control of the vehicle to assist a driver during a manual maneuvering process, for example, if a steering angle selected by the driver is unsuitable for a planned maneuvering process, however, is not achieved by the systems known from the prior art.

SUMMARY

Proceeding therefrom, the object of the disclosure is in particular to provide a system having improved properties with respect to maneuverability. The object is achieved by the features of the disclosure, while advantageous embodiments and refinements of the disclosure can be inferred from the embodiments.

A method is proposed for, in particular manual and/or semi-manual, maneuvering of a vehicle, in particular a motor vehicle, wherein the vehicle has a steer-by-wire steering system having a steering handle and having at least one steering gear actuator for changing a travel direction of the vehicle, wherein in a manual driving operating state, a maneuvering process, which is in particular manual, is recognized at least on the basis of a steering specification at the steering handle, for example in the form of a specific steering pattern and/or steering behavior, and a vehicle velocity, preferably of at most 20 km/h and particularly preferably at most 10 km/h, and at least on the basis of the steering specification at the steering handle and an environmental condition, a target vehicle trajectory correlated with a driver intention is ascertained or predicted for the maneuvering process, wherein an actual vehicle trajectory, in particular manually specified by a driver at the steering handle, during the maneuvering process is progressively compared to the target vehicle trajectory, and wherein the actual vehicle trajectory is corrected in the event of a deviation from the target vehicle trajectory, in particular in the event of a deviation outside a tolerance range, by means of a maneuvering assistance function and by an assisting intervention of the maneuvering assistance function in a lateral control of the vehicle, in particular automatically. In particular, the correction of the actual vehicle trajectory takes place in such a way that the actual vehicle trajectory corresponds to the target vehicle trajectory or in such a way that at least the deviation from the target vehicle trajectory is reduced. In the present case, the travel direction of the vehicle is thus controlled at least partially and in particular in a defined and/or specified scope independently of a steering specification of the driver or a driver target vehicle trajectory, which is in particular solely manual. The maneuvering assistance function works collaboratively here and assists the driver in the lateral control of the vehicle. Furthermore, the environmental condition is preferably acquired by means of an environmental sensor system of the vehicle and can correspond, for example, to a collision object and/or a parking space. In addition, to recognize the maneuvering process, in particular additionally, an acquisition signal of the environmental sensor system and/or, during the ascertainment and/or prediction of the target vehicle trajectory, in particular additionally, a vehicle velocity can advantageously be taken into consideration. A particularly flexible and/or secure maneuverability of the vehicle can be achieved by this embodiment. In particular, a driver can carry out a manual maneuvering process spontaneously and in an intuitive and familiar manner and at the same time be assisted continuously and without manual activation of the maneuvering assistance function during a lateral control of the vehicle. Moreover, an operational safety can advantageously be increased and/or a component strain due to frequent manual correction by the driver can be reduced.

A "steering gear actuator" is to be understood in this context as an actuator unit, which is in particular mechanically separated from the steering handle, for influencing and/or changing a travel direction of the vehicle. The steering gear actuator is preferably provided to transmit a steering specification, in particular of a driver, at the steering handle to the vehicle wheel by changing a wheel steering angle of at least one vehicle wheel and in this way advantageously to control at least an alignment of the vehicle wheel. For this purpose, the steering gear actuator advantageously comprises at least one steering positioning element, for example, in the form of a toothed rack, and at least one steering motor, for example in the form of an electric motor, operationally connected to the steering positioning element. The steering gear actuator can be designed as a single wheel actuator and can be assigned to precisely one vehicle wheel, which is in particular steerable and preferably designed as a front wheel. However, the steering gear actuator is preferably designed as a central actuator and is assigned to at least two vehicle wheels, which are in particular steerable and preferably designed as front wheels. Furthermore, a "manual driving operating state" is to be understood in particular as an operating state in which the vehicle is controlled by the driver, but at the same time assisting and/or correcting interventions, in particular at least in a lateral control of the vehicle, are still possible. The maneuvering assistance function in the manual driving operating state can thus assist the driver in the lateral control of the vehicle in a collaborative manner.

Furthermore, at least one processing unit is used, which is provided to carry out the method for maneuvering the vehicle. A "processing unit" is to be understood in this context in particular as an electrical and/or electronic unit, which has an information input, an information processing unit, and an information output. The processing unit furthermore advantageously has at least one processor, at least one operating memory, at least one input and/or output means, at least one operating program, at least one control routine, at least one regulating routine, at least one recognition routine, and/or at least one calculation routine. Moreover, the processing unit in particular comprises the maneuvering assistance function in the present case. The processing unit is in particular provided for the purpose, during the manual driving operating state, of ascertaining and evaluating a steering specification at the steering handle, for example, on the basis of a movement signal of the steering handle and/or an acquisition signal of a torque sensor connected to the steering handle, a vehicle velocity, for example on the basis of an acquisition signal of an internal vehicle sensor system of the vehicle, and at least one environmental condition, for example on the basis of an acquisition signal of the environmental sensor system of the vehicle. Moreover, the processing unit is provided in the present case for the purpose, in the manual driving operating state, to recognize at least on the basis of the steering specification at the steering handle and the vehicle velocity, a maneuvering process, in particular automatically, and to ascertain or predict, at least on the basis of the steering specification at the steering handle and the environmental condition, a target vehicle trajectory correlated with a driver intention for the maneuvering process. In addition, the processing unit is provided for the purpose of comparing an actual vehicle trajectory, in particular specified manually by a driver at the steering handle, during the maneuvering process, which is in particular manual, progressively to the target vehicle trajectory and in the event of a deviation from the target vehicle trajectory, in particular in the event of a deviation outside of a tolerance range, correcting the maneuvering assistance function in a lateral control of the vehicle by means of the maneuvering assistance function and by an assisting intervention of the maneuvering assistance function, in particular in such a way that the actual vehicle trajectory corresponds to the target vehicle trajectory or in such a way that at least the deviation from the target vehicle trajectory is reduced. The processing unit is preferably integrated here into the vehicle and particularly preferably into a control unit of the vehicle. "Provided" is to be understood in particular as especially programmed, designed, and/or equipped. An object being provided for a specific function is to be understood in particular to mean that the object fulfills and/or executes this specific function in at least one application and/or operating state.

Furthermore, it is proposed that the maneuvering process is a driving process at a low vehicle velocity, preferably at most 20 km/h and particularly preferably at most 10 km/h. In particular, the maneuvering process can correspond to a driving process in the forward direction and/or a driving process in the reverse direction. The maneuvering process is particularly advantageously a navigating process, which is in particular manual, and/or a parking process, which is in particular manual, in particular a pulling in process and/or a pulling out process. In this way, particularly secure maneuverability can be achieved in critical driving situations.

To correct the actual vehicle trajectory, for example, an additional steering torque could be applied to the steering handle by the maneuvering assistance function. Furthermore, alternatively or additionally to the correction of the actual vehicle trajectory, an operating unit of the steer-by-wire steering system, which in particular comprises the steering handle and is made mechanically separate from the steering gear actuator, could be activated by means of the maneuvering assistance function. According to one particularly preferred embodiment, however, it is proposed that to correct the actual vehicle trajectory, the steering gear actuator and in particular the steering motor of the steering gear actuator is activated by means of the maneuvering assistance function, whereby in particular an advantageously direct intervention and/or a particularly inconspicuous assistance of the driver can be achieved. A position of the steering positioning element of the steering gear actuator is preferably modified here as a function of the deviation of the actual vehicle trajectory from the target vehicle trajectory by the maneuvering assistance function and in particular by activation of the steering motor.

In addition, it is proposed that the environmental condition is correlated with an object and/or obstacle in a region of the vehicle and is taken into consideration in such a way, in particular in the ascertainment of the target vehicle trajectory and/or during the maneuvering process, that a collision of the vehicle with the object and/or obstacle is prevented. The object and/or obstacle in the region of the vehicle is therefore preferably taken into consideration in the ascertainment of the target vehicle trajectory and the actual vehicle trajectory is corrected in the event of a deviation from the target vehicle trajectory by means of the maneuvering assistance function and by an assisting intervention of the maneuvering assistance function in the lateral control of the vehicle in such a way that a collision of the vehicle with the object and/or obstacle is prevented. "A region of the vehicle" is to be understood in this context in particular as a spatial region which is arranged around the vehicle in such a way that a movement of the vehicle and/or a further movement of the vehicle results or would result in a contact and/or a collision of the vehicle with the object and/or obstacle. In particular, the region of the vehicle comprises at least one further partial region deviating from a region of a vehicle wheel, for example, a region of a rear or front bumper of the vehicle. In this way, in particular damage to the vehicle during the manual maneuvering process can be prevented particularly effectively.

Alternatively or additionally, it is proposed that the environmental condition is correlated with a parking space and is taken into consideration in such a way, in particular in the ascertainment of the target vehicle trajectory and/or during the maneuvering process, that a parking position of the vehicle, in particular in the parking space, is optimized. The parking space is therefore preferably taken into consideration in the ascertainment of the target vehicle trajectory and the actual vehicle trajectory is corrected in the event of a deviation from the target vehicle trajectory by means of the maneuvering assistance function and by an assisting intervention of the maneuvering assistance function in the lateral control of the vehicle in such a way that a parking position of the vehicle, in particular in the parking space, is optimized. A parking process can be significantly simplified and frequent manual correction by the driver can be reduced in this way. Moreover, a manual activation of the maneuvering assistance function before beginning the parking process and a prior recognition of a matching parking space can advantageously be omitted.

The maneuvering assistance function could, for example, be permanently activated after a system start of the vehicle. However, it is advantageously proposed that the maneuvering assistance function is automatically activated and/or deactivated in dependence on the steering specification and/or the vehicle velocity. At least one steering pattern, in particular by a driver at the steering handle, and/or falling below a limiting value for the vehicle velocity, in particular 20 km/h and advantageously 10 km/h, is particularly advantageously ascertained and evaluated for the automatic activation of the maneuvering assistance function. Moreover, at least one further steering pattern, in particular by a driver at the steering handle, and/or exceeding a further limiting value for the vehicle velocity, in particular 10 km/h and advantageously 20 km/h, is advantageously ascertained and evaluated for the automatic deactivation of the maneuvering assistance function. Alternatively, however, the maneuvering assistance function could also be deactivated automatically after a specified and/or specifiable time span, for example several minutes after activation. In addition, navigation data, for example of a navigation device installed in the vehicle, and/or acquisition signals of the environmental sensor systems of the vehicle can be taken into consideration in the automatic activation and/or deactivation of the maneuvering assistance function. In this way in particular an advantageous automation of the method can be achieved and processing power can be reduced at the same time.

Furthermore, the maneuvering assistance function could in principle be provided for an unlimited intervention in the lateral control of the vehicle, in particular in such a way that in the event of a correction of the actual vehicle trajectory by the maneuvering assistance function, the actual vehicle trajectory always corresponds to the target vehicle trajectory. In one preferred embodiment, however, it is proposed that a maximum intervention of the maneuvering assistance function in the lateral control of the vehicle is limited, in particular in such a way that a driver target vehicle trajectory specified by the driver, in particular solely manually, is substantially followed and nonetheless in the event of a correction of the actual vehicle trajectory by the maneuvering assistance function, the deviation from the target vehicle trajectory is at least reduced. The actual vehicle trajectory can thus deviate from the target vehicle trajectory in the event of an intervention by the maneuvering assistance function, but at the same time overruling of the driver by the maneuvering assistance function can advantageously be prevented.

In principle, an intervention of the maneuvering assistance function in the lateral control of the vehicle could be fed back to a driver, for example by a vibration of the steering handle, by a notification message in an onboard computer, and/or by an activated notification light on the steering handle and/or in a center console of the vehicle. However, it is preferably proposed that the actual vehicle trajectory is corrected, in particular by the maneuvering assistance function, in such a way that an occupant does not notice the intervention of the maneuvering assistance function in the lateral control of the vehicle. A particularly inconspicuous assistance of the driver can be achieved in this way.

Furthermore, a particularly high level of operational safety can be achieved in particular if, in the event of an imminent collision of the vehicle with an object and/or obstacle and in the case that the collision cannot be prevented by an intervention of the maneuvering assistance function in the lateral control of the vehicle, an intervention takes place in a longitudinal control of the vehicle, in particular in the form of automatic braking of the vehicle and/or in the form of automatic emergency braking. In particular, the intervention in the longitudinal control of the vehicle is carried out directly by the maneuvering assistance function or at least prompted by a corresponding signal of the maneuvering assistance function.

In addition, it is proposed that the ascertained target vehicle trajectory or at least the presence of a corresponding target vehicle trajectory is displayed to a driver of the vehicle, for example by means of an onboard computer of the vehicle, and upon confirmation by the driver, for example by actuation of a function button in a center console of the vehicle and/or on the steering handle, a change is made from the manual driving operating state and/or the maneuvering process, which is in particular manual, into an automated driving operating state, in which an automated maneuvering process is carried out. A driver can advantageously start an automatic maneuvering process as needed in this way and therefore dispense with manual maneuvering. It is advantageously possible here to change at an arbitrary point in time during the manual maneuvering process into the automated maneuvering process, for example, after manually navigating once or after a failed manual pulling in attempt. Moreover, a movement of the steering handle is preferably restricted in the automated driving operating state and/or during the automated maneuvering process, preferably in such a way that the driver can hold his hands during the entire automatic maneuvering process on the steering handle and/or in such a way that an alignment of the steering handle is kept constant or a stationary steering handle is achieved.

The method for maneuvering the vehicle and the vehicle are not to be restricted here to the above-described application and embodiment. In particular, the method for maneuvering the vehicle and the vehicle can have a number deviating from a number mentioned herein of individual elements, components, and units to fulfill a functionality described herein.

BRIEF DESCRIPTION OF THE DRAWINGS

Further advantages result from the following description of the drawings. An exemplary embodiment of the disclosure is illustrated in the drawings.

In the figures.

DETAILED DESCRIPTION

Figure 1A:
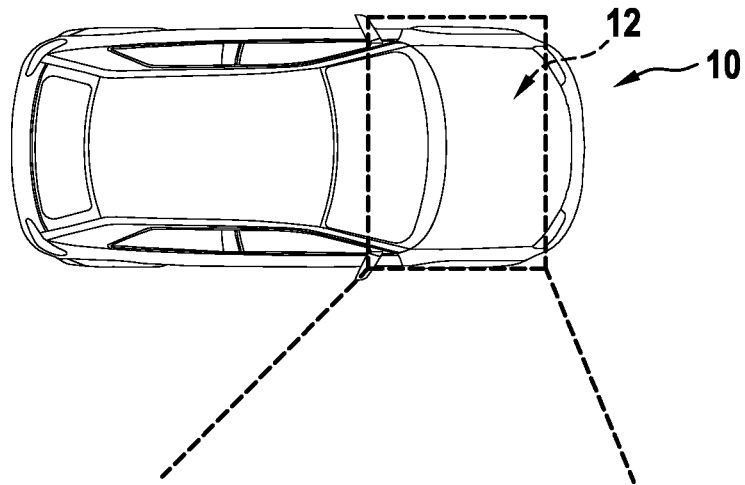
FIGS. 1a-b show a vehicle having a steer-by-wire steering system in a simplified illustration.
Figure 1B:
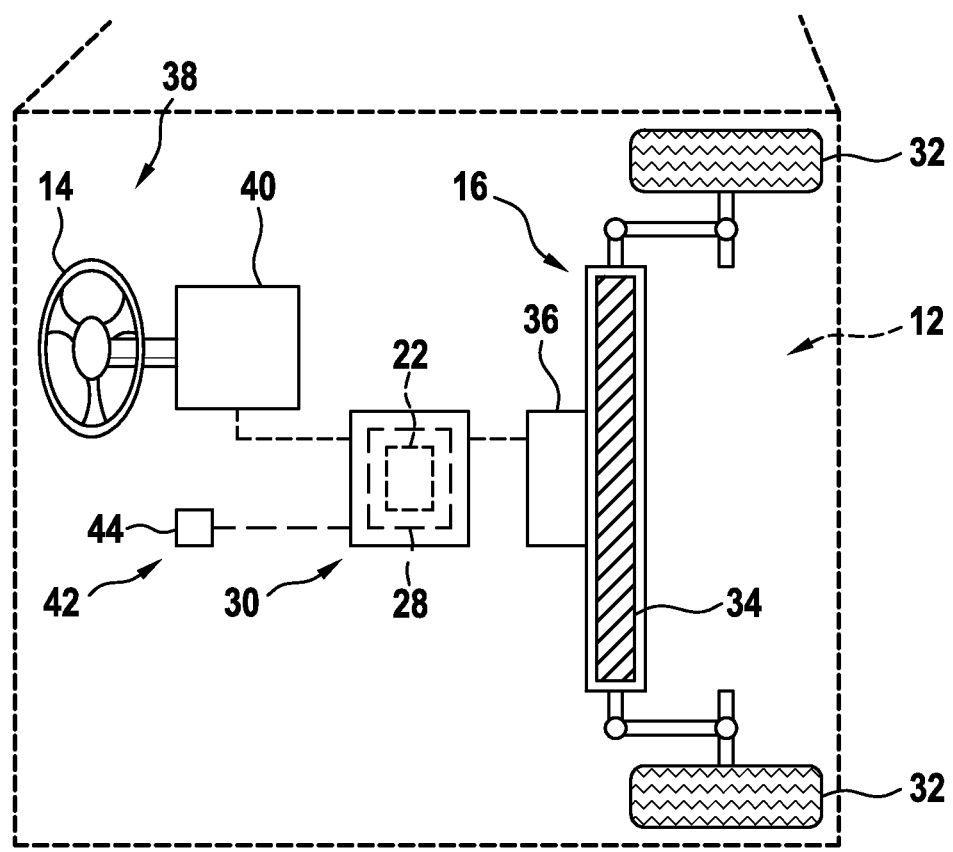

FIGS. 1a and 1b show a vehicle 10 designed by way of example as a passenger vehicle having multiple vehicle wheels 32 and having a steer-by-wire steering system 12 in a simplified illustration. The steer-by-wire steering system 12 has an operational connection to the vehicle wheels 32 and is provided for influencing a travel direction of the vehicle 10. In the present case, a steering specification is passed on exclusively electrically to the vehicle wheels 32. In principle, however, a vehicle could also be designed as a utility vehicle or tracked vehicle.

The steer-by-wire steering system 12 has a steering gear actuator 16 known per se. The steering gear actuator 16 is designed in the present case as a wheel steering angle actuator. Furthermore, the steering gear actuator 16 is designed by way of example as a central actuator. The steering gear actuator 16 has an operational connection to at least two of the vehicle wheels 32, in particular two front wheels, and is provided for the purpose of converting a steering specification into a steering movement of the vehicle wheels 32 and in this way changing a travel direction of the vehicle 10. For this purpose, the steering gear actuator 16 comprises a steering positioning element 34 designed, for example, as a toothed rack and a steering motor 36 interacting with the steering actuating element 34. The steering motor 36 is designed as an electric motor, in particular as a permanently excited synchronous motor, and is provided for controlling the steerable vehicle wheels 32. In principle, a steer-by-wire steering system could also comprise multiple steering gear actuators, in particular designed as single wheel actuators, of course. Furthermore, a steering gear actuator could comprise multiple steering motors.

In addition, the steer-by-wire steering system 12 has an operating unit 38, actuatable in particular by a driver and/or occupants. The operating unit 38 is made mechanically separate from the steering gear actuator 16. The operating unit 38 is connected solely electrically to the steering gear actuator 16. The operating unit 38 comprises a steering handle 14, for example in the form of a steering wheel, and a feedback unit 40, which is in particular mechanically coupled to the steering handle 14. The feedback unit 40 is designed as a feedback actuator and is provided at least to generate a steering resistance and/or a feedback torque on the steering handle 14. For this purpose, the feedback unit 40 comprises at least one further electric motor (not shown), designed in particular as a permanently excited synchronous motor. Alternatively, a steering handle could also be designed as a joystick, as a steering lever, and/or as a steering ball or the like. Furthermore, a feedback unit could comprise multiple electric motors. Moreover, it is conceivable to at least temporarily connect an operating unit and a steering gear actuator to one another by means of a steering shaft.

Furthermore, the vehicle 10 comprises an environmental sensor system 42. The environmental sensor system 42 is provided to acquire at least one detection signal correlated with an environment of the vehicle 10. In the present case, the environmental sensor system 42 is provided to acquire an entire environment of the vehicle 10. For this purpose, the environmental sensor system 42 can comprise at least one environmental sensor 44 and advantageously a plurality of environmental sensors 44. At least one of the environmental sensors 44 can be designed, for example, as a radar sensor, as a lidar sensor, as a sound sensor, and/or as a camera sensor or the like.

In addition, the vehicle 10 has a control unit 30. The control unit 30 is designed, for example, as a steering control unit and is therefore part of the steer-by-wire steering system 12. The control unit 30 has an electrical connection to the operating unit 38 and to the steering gear actuator 16. The control unit 30 thus couples the operating unit 38 to the steering gear actuator 16. Moreover, the control unit 30 has an electrical connection to the environmental sensor system 42. The control unit 30 is provided to control an operation of the steer-by-wire steering system 12 and therefore to control a lateral control of the vehicle 10. The control unit 30 is provided to activate the steering motor 36 in dependence on a signal of the operating unit 38, for example, in dependence on a steering specification and/or a manual torque. The control unit 30 can furthermore be provided for the purpose of activating the feedback unit 40 in dependence on a signal of the steering gear actuator 16.

For this purpose, the control unit 30 comprises a processing unit 28. The processing unit 28 comprises at least one processor (not shown), for example in the form of a microprocessor, and at least one operating memory (not shown). Moreover, the processing unit 28 comprises at least one operating program stored in the operating memory having at least one calculation routine, at least one recognition routine, at least one control routine, and at least one regulating routine. In addition, in the present case the processing unit 28 comprises a maneuvering assistance function 22. In principle, however, a steering system could also comprise multiple control units, wherein a first control unit having at least one first processing unit is assigned to an operating unit, while a second control unit having at least one second processing unit is assigned to a steering gear actuator. In this case, the first control unit and the second control unit could communicate with one another electrically. Furthermore, a control unit could also be different from a steering system and could be designed, for example, as a central control unit of a vehicle. In addition, a processing unit could in principle also be different from a vehicle and could be integrated, for example, in an external computer network, advantageously in the form of a cloud network. Furthermore, a control unit could be provided for the purpose of activating a feedback unit independently of signals of a steering gear actuator.

In addition, the vehicle 10 can comprise further components and/or assemblies, for example, an internal vehicle sensor system (not shown) known per se for acquiring a vehicle velocity, an onboard computer (not shown) known per se, and/or a navigation device (not shown) known per se. The control unit 30 preferably has an electrical connection to the internal vehicle sensor system, the onboard computer, and/or the navigation device. In principle, an internal vehicle sensor system, an onboard computer, and/or a navigation device could also be at least partially dispensed with, however.

In the following, an exemplary method for maneuvering the vehicle 10 will be explained, in which the vehicle 10 is in particular in a manual driving operating state, thus in an operating state in which the vehicle 10 is controlled by the driver, but nonetheless assisting and/or correcting interventions in a lateral control of the vehicle 10 are possible. In the present case, the processing unit 28 is provided to execute the method and in particular has a computer program having corresponding program code means for this purpose. In principle, the method could also be executed by a first processing unit of an operating unit, a second processing unit of a steering gear actuator, or a processing unit differing therefrom, however.

In the present case, in the manual driving operating state, a maneuvering process, for example a navigating process and/or a parking process, is automatically detected at least on the basis of a steering specification at the steering handle 14 and a vehicle velocity of the vehicle 10. Moreover, a driver target vehicle trajectory 20, which is in particular solely manual, can be ascertained on the basis of the steering specification at the steering handle 14. In principle, the ascertainment of a driver target vehicle trajectory could also be omitted, however. Subsequently, a target vehicle trajectory 18 correlated with a driver intention is ascertained or predicted for the maneuvering process at least on the basis of the steering specification at the steering handle 14 or on the basis of the driver target vehicle trajectory 20 derived from the steering specification and an environmental condition, which is acquired in particular by means of the environmental sensor system 42. Moreover, using the environmental sensor system 42 and/or the internal vehicle sensor system, an actual vehicle trajectory is acquired and progressively compared during the maneuvering process to the target vehicle trajectory 18. If a deviation is established between the actual vehicle trajectory and the target vehicle trajectory 18, which is outside a tolerance range, the actual vehicle trajectory is thus automatically corrected by means of the maneuvering assistance function 22 and by an assisting intervention of the maneuvering assistance function 22 in a lateral control of the vehicle 10, in particular in such a way that the actual vehicle trajectory again corresponds to the target vehicle trajectory 18 or at least in such a way that the deviation from the target vehicle trajectory 18 is reduced.

In the present case, for this purpose the steering gear actuator 16 and in particular the steering motor 36 of the steering gear actuator 16 is activated by means of the maneuvering assistance function 22 and a position of the steering positioning element 34 of the steering gear actuator 16 is modified in dependence on the deviation of the actual vehicle trajectory from the target vehicle trajectory 18. Alternatively or additionally, a maneuvering assistance function could also be provided, however, to activate an operating unit, in particular a feedback unit of the operating unit, and/or to apply an additional steering torque to a steering handle.

Figure 2C:
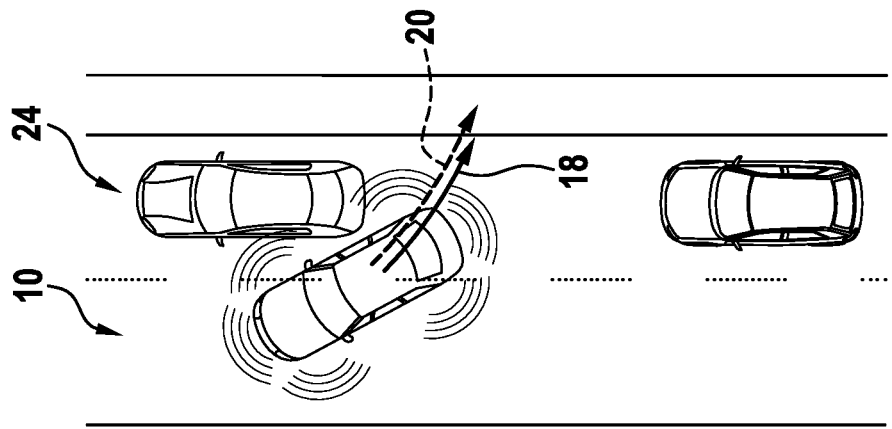
FIGS. 2a-f show a schematic illustration of the vehicle during a maneuvering process in various operating states.
Figure 2B:
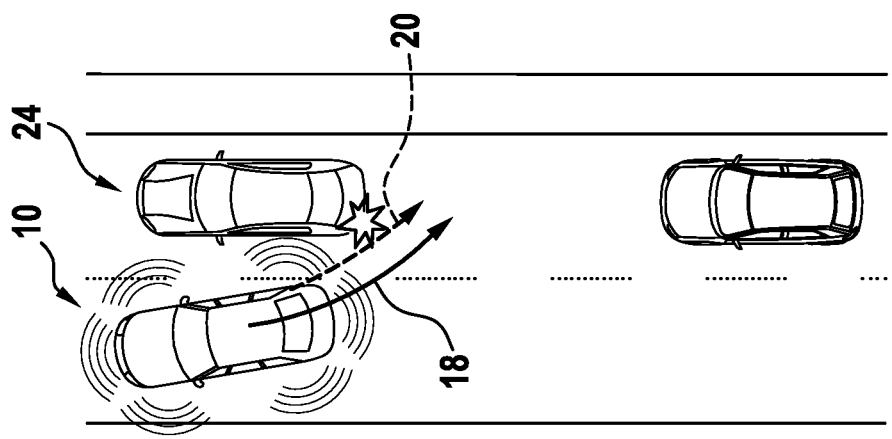
Figure 2A:
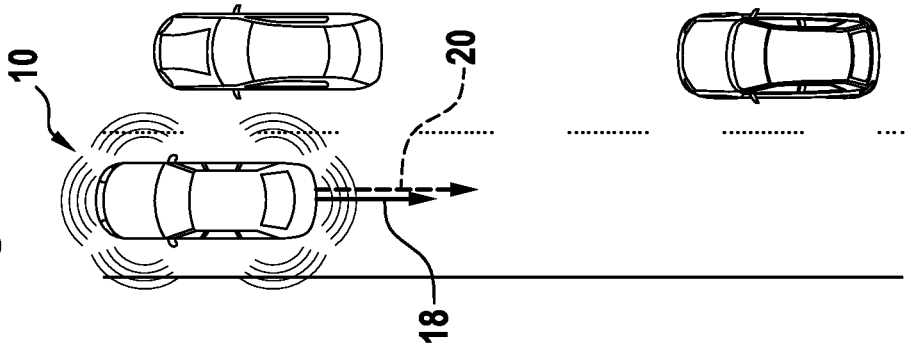

The environmental condition can be correlated with an object and/or obstacle 24 in a region of the vehicle 10 and can be taken into consideration in such a way that a collision of the vehicle 10 with the object and/or obstacle 24 is prevented (cf. in particular also FIGS. 2b and 2c). In this case, the object and/or obstacle 24 in the region of the vehicle 10 is taken into consideration in the ascertainment of the target vehicle trajectory 18 and the actual vehicle trajectory is corrected in the event of a corresponding deviation from the target vehicle trajectory 18 by means of the maneuvering assistance function 22 and by an assisting intervention of the maneuvering assistance function 22 in the lateral control of the vehicle 10 in such a way that a collision of the vehicle 10 with the object and/or obstacle 24 is prevented.

Figure 2F:
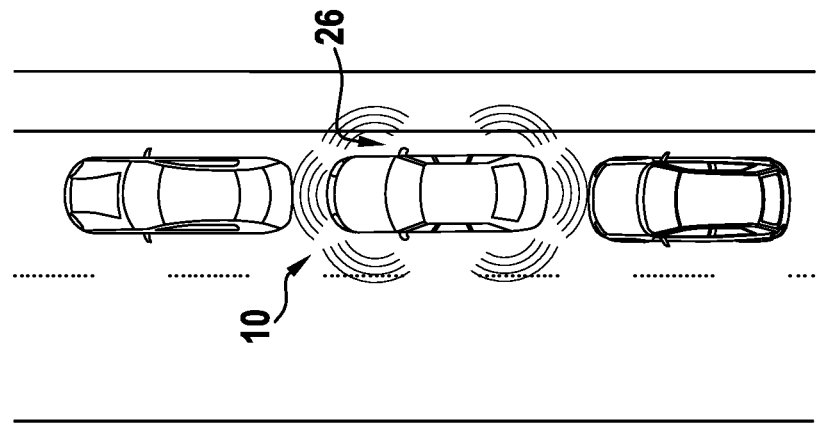
Figure 2E:
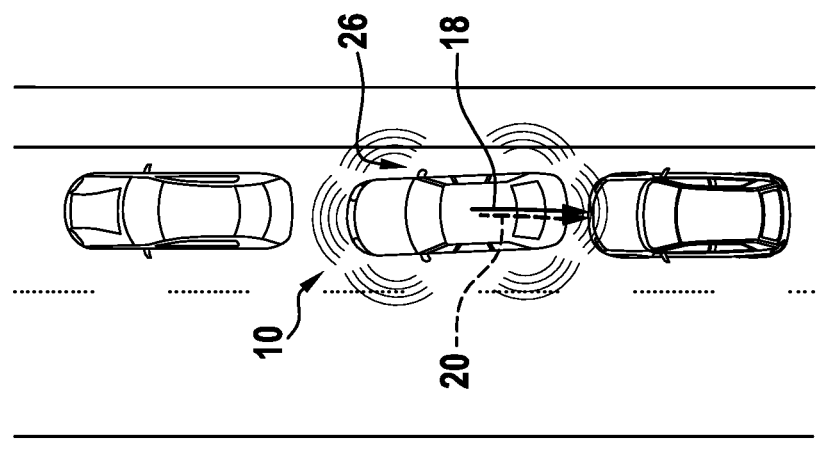
Figure 2D:
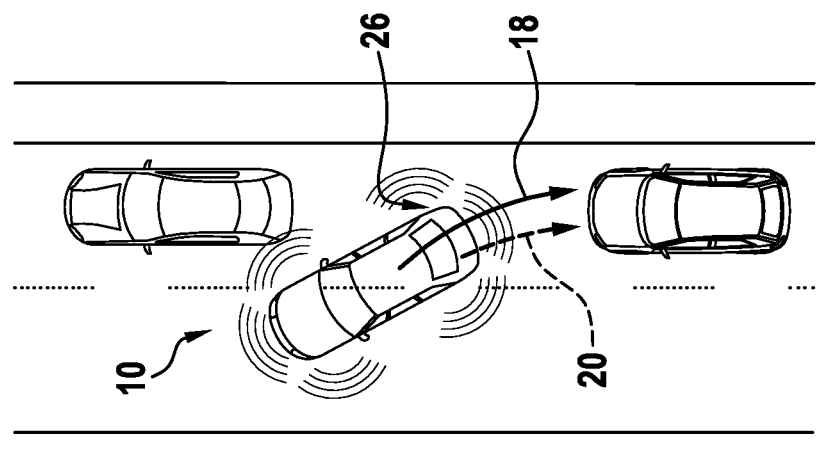

Alternatively or additionally, the environmental condition can be correlated with a parking space 26 and can be taken into consideration in such a way that a parking position of the vehicle 10 in the parking space 26 is optimized (cf. in particular also FIGS. 2d to 2f). In this case, the parking space 26 is thus taken into consideration in the ascertainment of the target vehicle trajectory 18 and the actual vehicle trajectory is corrected in the event of a corresponding deviation from the target vehicle trajectory 18 by means of the maneuvering assistance function 22 and by an assisting intervention of the maneuvering assistance function 22 in the lateral control of the vehicle 10 in such a way that a parking position of the vehicle 10 in the parking space 26 is optimized.

Furthermore, in the present case a maximum intervention of the maneuvering assistance function 22 in the lateral control of the vehicle 10 is limited, in such a way that the actual vehicle trajectory specified by the driver is substantially followed and nonetheless in the event of a correction of the actual vehicle trajectory by the maneuvering assistance function 22, the deviation from the target vehicle trajectory 18 is at least reduced. The actual vehicle trajectory is corrected by the maneuvering assistance function 22 in such a way that an occupant and in particular the driver does not notice the intervention of the maneuvering assistance function 22 in the lateral control of the vehicle 10. In this case, the actual vehicle trajectory can deviate from the target vehicle trajectory 18 to a small extent in the event of an intervention by the maneuvering assistance function 22, but at the same time overruling of the driver by the maneuvering assistance function 22 can be prevented and therefore a particularly inconspicuous assistance of the driver can be achieved.

The intervention of the maneuvering assistance function 22 in the lateral control thus takes place at least partially independently of the steering specification of the driver, but in such a way that the vehicle 10 follows an ascertained and/or predicted driver intention or a target vehicle trajectory 18 linked to the driver intention as exactly as possible.

Alternatively, a maneuvering assistance function could also be provided for an unlimited intervention in a lateral control of a vehicle. Such an unlimited intervention or a corresponding degree of assistance of a maneuvering assistance function could be settable by a driver, for example. Moreover, an intervention of a maneuvering assistance function in a lateral control of a vehicle could be fed back to a driver, for example, by applying haptic feedback, such as a vibration, to a steering handle, by a notification message in an onboard computer, and/or by an activated notification light.

In addition, the maneuvering assistance function 22 is automatically activated in dependence on the steering specification at the steering handle 14 and/or the vehicle velocity. For automatic activation of the maneuvering assistance function 22, a specific steering pattern and/or falling below a limiting value for the vehicle velocity is ascertained and evaluated. The limiting value for the vehicle velocity is, for example, 10 km/h. A deactivation of the maneuvering assistance function 22 takes place automatically in the present case, specifically after a specified and/or specifiable time span after the activation. Alternatively, a maneuvering assistance function could also be permanently activated after a system start of the vehicle. Moreover, it is conceivable to deactivate a maneuvering assistance function automatically in dependence on a steering specification at the steering handle 14 and/or a vehicle velocity.

Furthermore, an automatic intervention in a longitudinal control of the vehicle 10 can additionally also take place. In the event of an imminent collision of the vehicle 10 with an object and/or obstacle 24 and in the case in which the collision cannot be prevented by an intervention of the maneuvering assistance function 22 in the lateral control of the vehicle 10, an intervention is preferably carried out in a longitudinal control of the vehicle 10, in particular in the form of automatic braking of the vehicle and/or in the form of automatic emergency braking. In the present case, the intervention in the longitudinal control of the vehicle is at least prompted by a corresponding signal of the maneuvering assistance function 22 and executed by the processing unit 28. In principle, however, such an intervention in a longitudinal control of the vehicle could also be dispensed with.

According to a further embodiment, the ascertained target vehicle trajectory 18 or at least the presence of a corresponding target vehicle trajectory 18 is furthermore displayed to a driver of the vehicle 10, for example, by means of the onboard computer. Upon a corresponding confirmation by the driver, for example, by actuating a function button (not shown) on the steering handle 14, it is subsequently possible to change from the manual driving operating state into an automated driving operating state, in which an automated maneuvering process is carried out. In this way, a driver can start an automatic maneuvering process if needed and therefore dispense with manual maneuvering. Moreover, during the automated maneuvering process, a movement of the steering handle 14 is preferably restricted, at least in such a way that the driver can keep his hands on the steering handle 14 during the entire maneuvering process. Alternatively, such an automated driving operating state and/or maneuvering process could also be dispensed with, however. Moreover, it is conceivable to dispense with a restriction of a movement of a steering handle.

FIGS. 2a to 2f show an exemplary application of the method in the form of a pulling in process at a roadway edge. An arrow identified by the reference sign 20 represents a solely manual or hypothetical driver target vehicle trajectory 20, which the vehicle 10 would follow or follows on the basis of the manual steering specification of the steering handle 14 and without intervention of the maneuvering assistance function 22 in the lateral control of the vehicle 10. Without intervention of the maneuvering assistance function 22 in the lateral control of the vehicle 10, the actual vehicle trajectory therefore corresponds during the maneuvering process to the driver target vehicle trajectory 20 and at the same time to the target vehicle trajectory 18 correlated with the driver intention ascertained or predicted for the maneuvering process. The target vehicle trajectory 18 and the driver target vehicle trajectory 20 are accordingly identical to one another, if no intervention of the maneuvering assistance function 22 in the lateral control of the vehicle 10 takes place during the maneuvering process. In principle, the method can be used for arbitrary maneuvering processes, for example, a pulling in process having a parking space located transversely to the roadway or to the travel direction, a pulling out process, or a navigating process differing from a parking process. Moreover, the method can be used in principle in a driving process in the forward direction and a driving process in the reverse direction.

In the present case, the vehicle 10 is in the manual driving operating state. In this case, a steering specification at the steering handle 14 and a vehicle velocity of the vehicle 10 are progressively monitored and evaluated. The environmental sensor system 42 preferably simultaneously scans the environment of the vehicle 10 in the background. This functionality can be activated as a standard feature, so that no additional manual activation by the driver is necessary.

In the exemplary embodiment according to FIGS. 2a to 2f, the driver now spontaneously decides for a pulling in process in reverse into the parking space 26 located lengthwise in relation to the roadway. The driver therefore engages a reverse gear and travels at low vehicle velocity in reverse (cf. FIG. 2a). A deflection of the steering handle 14 is initially 0° by way of example.

Subsequently, the driver begins to steer to the right manually during his slow reverse travel (cf. FIG. 2b). On the basis of the steering specification at the steering handle 14 and on the basis of the vehicle velocity, in this case a corresponding maneuvering process, in the present case in particular initially in the form of a navigating process, is detected. In particular, the maneuvering process is recognized if the steering specification at the steering handle 14 has a specific steering pattern and the vehicle velocity is in a defined and/or definable velocity range, preferably less than 15 km/h. Furthermore, on the basis of the steering specification at the steering handle 14 and the existing environmental conditions, a target vehicle trajectory 18 correlated with a driver intention is ascertained or predicted for the maneuvering process. The target vehicle trajectory 18 is progressively compared during the maneuvering process to the actual vehicle trajectory manually specified by the driver at the steering handle 14. If a deviation from the target vehicle trajectory 18, for example, due to steering in too early, and an imminent collision with the object and/or obstacle 24 caused thereby is detected, the actual vehicle trajectory is thus corrected by the maneuvering assistance function 22 and by an assisting intervention of the maneuvering assistance function 22 in the lateral control of the vehicle 10 and the collision is thus avoided. In the present case, the actual vehicle trajectory is thus adapted by the maneuvering assistance function 22 in such a way that the vehicle 10 no longer follows the driver target vehicle trajectory 20, but rather the target vehicle trajectory 18 correlated with the driver intention. In the ideal case, the driver is completely unaware of the intervention in the lateral control of the vehicle 10, so that he has the feeling of having done everything correctly.

After the collision has been avoided and no further collision threatens, the vehicle 10 again follows the actual vehicle trajectory and therefore the steering specification of the driver at the steering handle 14 (cf. FIG. 2c).

On the basis of the further steering specifications at the steering handle 14, on the basis of the vehicle velocity, and in consideration of the acquisition signal of the environmental sensor system 42, an intention to pull in into the parking space 26 and therefore a further maneuvering process are subsequently detected (cf. FIG. 2d). The target vehicle trajectory 18 is thus updated in consideration of the driver intention on the basis of the further steering specifications and the present environmental conditions. In principle, of course, a further target vehicle trajectory correlated with a driver intention could also be ascertained or predicted for the further maneuvering process. The target vehicle trajectory 18 is also progressively compared in this case during the further maneuvering process to the actual vehicle trajectory manually specified by the driver at the steering handle 14, in order to assist the driver in the alignment of the vehicle 10 in the parking space 26, for example, with regard to a distance to a curbstone and/or to a roadway edge. If a deviation from the target vehicle trajectory 18 is detected, for example, due to turning in too early, the actual vehicle trajectory is thus corrected by the maneuvering assistance function 22 and by an assisting intervention of the maneuvering assistance function 22 in the lateral control of the vehicle 10 and in this way a parking position of the vehicle 10 in the parking space 26 is optimized (cf. FIGS. 2d, 2e, and 2f). The actual vehicle trajectory is thus also adapted in this case by the maneuvering assistance function 22 in such a way that the vehicle 10 no longer follows the driver target vehicle trajectory 20, but rather the target vehicle trajectory 18 correlated with the driver intention. In the ideal case, the driver is again completely unaware of the intervention in the lateral control of the vehicle 10. In this context, it furthermore has to be taken into consideration that the assisted alignment can only deviate to a certain extent from the actual vehicle trajectory, since the maneuvering assistance function 22 operates collaboratively in the present case and thus follows the travel direction specified by the driver or the driver target vehicle trajectory as much as possible.

Figure 3:
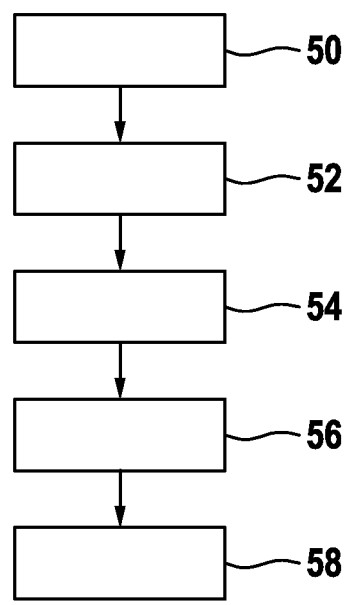
FIG. 3 shows an exemplary flow chart having main method steps of a method for maneuvering the vehicle.

Finally, FIG. 3 shows an exemplary flow chart having main method steps of the method for maneuvering the vehicle 10.

A method step 50 corresponds to a state in which the vehicle 10 is in a manual driving operating state. A steering specification at the steering handle 14 and a vehicle velocity of the vehicle 10 are progressively monitored and evaluated. Moreover, the environmental sensor system 42 simultaneously scans the environment of the vehicle 10 in the background.

In a method step 52, a maneuvering process, for example, a navigating process and/or parking process, is automatically detected at least on the basis of the steering specification at the steering handle 14 and the vehicle velocity of the vehicle 10. In the present case, it is thus detected that the driver has the intention of subsequently executing a manual maneuvering process.

In a method step 54, a target vehicle trajectory 18 correlated with a driver intention for the intended maneuvering process is then ascertained or predicted at least on the basis of the steering specification and an environmental condition, which is acquired in particular by means of the environmental sensor system 42.

In a method step 56, the manual maneuvering process is carried out by the driver. An actual vehicle trajectory specified manually by a driver at the steering handle 14 is acquired and progressively compared to the target vehicle trajectory 18 during the maneuvering process.

In a method step 58, a deviation between the actual vehicle trajectory and the target vehicle trajectory 18 is established, which is outside a tolerance range. As a result, the actual vehicle trajectory is automatically corrected by means of the maneuvering assistance function 22 and by an assisting intervention of the maneuvering assistance function 22 in a lateral control of the vehicle 10, in such a way that the actual vehicle trajectory again corresponds to the target vehicle trajectory 18 or at least in such a way that the deviation from the target vehicle trajectory 18 is reduced.

The exemplary flow chart in FIG. 3 is in particular solely to describe a method for maneuvering the vehicle 10 by way of example. In particular, individual method steps can also vary. Furthermore, optional method steps can be added, for example, the automatic activation of the maneuvering assistance function 22 and/or an automatic intervention in a longitudinal control of the vehicle 10 in the event of an imminent collision of the vehicle 10 with an object and/or obstacle 24.

What is claimed is:

1. A vehicle comprising:
   an environmental sensor system;
   a steer-by-wire steering system including:
      a steering handle, and
      at least one steering gear actuator including (i) a toothed rack coupled to at least one vehicle wheel of the vehicle, and (ii) a steering motor coupled to the toothed rack and configured to move the toothed rack to cause a steering movement of the at least one vehicle wheel that changes a travel direction of the vehicle, the steering handle mechanically separate from the at least one steering gear actuator; and
   a controller having a processor configured to:
      detect, in a manual driving operating state, a manual maneuvering process at least based on a steering specification at the steering handle and a vehicle velocity;
      identify an environmental condition using the environmental sensor system, the environmental condition corresponding to a parking space near the vehicle;
      predict a target vehicle trajectory for the manual maneuvering process, based on the environmental condition, the target vehicle trajectory configured to park the vehicle in the parking space;
      identify an actual vehicle trajectory corresponding to the steering specification, the target vehicle trajectory different from the actual vehicle trajectory;
      progressively compare, during the manual maneuvering process, the actual vehicle trajectory with the target vehicle trajectory;
      move the vehicle to the target vehicle trajectory in response to a deviation of the actual vehicle trajectory from the target vehicle trajectory, using a maneuvering assistance function by an assisting intervention of the maneuvering assistance function in a lateral control of the vehicle,
      automatically activate the maneuvering assistance function depending on at least one of the steering specification and the vehicle velocity to move the vehicle to the target vehicle trajectory, and
      activate the at least one steering gear actuator using the maneuvering assistance function to move the vehicle,
   wherein the manual maneuvering process is detected by the controller when the vehicle velocity is at most twenty kilometers per hour (20 km/h).

2. The vehicle according to claim 1, wherein the processor is further configured to:
   limit a maximum intervention of the maneuvering assistance function in the lateral control of the vehicle.

3. The vehicle according to claim 1, wherein the processor is further configured to:
   prevent an overruling from an occupant of the vehicle during the assisting intervention of the maneuvering assistance function in the lateral control of the vehicle.

4. The vehicle according to claim 1, wherein the processor is further configured to:
   cause the vehicle to move to the target vehicle trajectory by an intervention of the maneuvering assistance function in a longitudinal control of the vehicle, in response to (i) a collision of the vehicle with at least one of an object and an obstacle being imminent, and (ii) the collision not being preventable by the assisting intervention of the maneuvering assistance function in the lateral control of the vehicle.

5. The vehicle according to claim 1, wherein the processor is further configured to:
   cause the target vehicle trajectory to be displayed to a driver of the vehicle; and
   change, upon confirmation by the driver, from the manual driving operating state into an automated driving operating state, in which an automated maneuvering process is carried out and in which a movement of the steering handle is restricted,
   wherein the vehicle is moved along the target vehicle trajectory during the automated maneuvering process.

6. The vehicle according to claim 1, wherein:
   the at least one steering gear actuator is configured as a central actuator,
   the vehicle includes two front vehicle wheels, and the toothed rack is coupled to the two front vehicle wheels.

7. The vehicle according to claim 1, wherein the vehicle is a motor vehicle.

8. The vehicle according to claim 1, wherein the manual maneuvering process occurs in a reverse direction of the vehicle.

9. The vehicle according to claim 1, wherein the manual maneuvering process is detected when the vehicle velocity is at most 10 km/h.

10. The vehicle according to claim 1, wherein the actual vehicle trajectory is corrected to the target vehicle trajectory without applying an additional steering torque to the steering handle.

* * * * *